Patented Jan. 18, 1949

2,459,467

UNITED STATES PATENT OFFICE 2,459,467

POLYAZO BENZIDINE DYES

Fritz Straub, Kaiseraugst, near Basel, and Jakob Brassel, Basel, Switzerland, assignors to Ciba Limited, Basel, Switzerland, a Swiss firm No Drawing. Application August 23, 1943, Serial No. 499,706. In Switzerland September 2, 1942

15 Claims. (Cl. 260—159)

The present invention is concerned with dis- and polyazo dyestuffs of the diaminodiphenyl series. It is an object of the present invention to provide valuable new dyestuffs which are substantive to cotton and other cellulosic fibers. More particularly the present invention provides a series of dyestuffs capable of forming complex metal compounds, for example, on after coppering on the fiber, and still more particularly it is an object of the present invention to provide dyestuffs of the said kind which dye cellulosic fibers red shades of very good fastness to light.

It is well known in the art to produce substantive dyestuffs capable of forming complex metal compounds by uniting tetrazotized 3:3'-dialkoxy-4:4'-diaminodiphenyls, especially tetrazotized dianisidine, with coupling components. Although these dyestuffs, as a rule, are substantially improved by an after-coppering on the fiber, the dyeings thus obtained are defective in several ways. Many shades, and inter alia clear red shades are not obtainable with these known dyestuffs, and even the after-coppered dyeings are not fast to washing and their fastness to light is much impaired by subsequent wet treatments, for example by mild soaping. Therefore there is a strong demand for dyestuffs which are superior to these known dyestuffs.

It has now been found that valuable dis- and polyazo dyestuffs may be obtained by coupling tetrazo compounds with azo components, if necessary using further coupling and connecting reactions, if tetrazotized 3-hydroxy-4:4'-diaminodiphenyls are used as tetrazo compounds, of which one ortho-position to the amino group standing in 4'-position is occupied by a group incapable of forming salts, and if desired causing agents yielding metal to react with the dyestuffs thus obtained.

The 3-hydroxybenzidines used as starting materials for the present invention contain in the 5'-position hydrogen and in the 3'-position a substituent which is incapable of forming salts such as an alkyl (especially methyl), halogen or preferably an alkoxy group. Amongst alkoxy groups the methoxy group is preferred, but it is to be understood that other alkoxy groups, such as ethoxy, propyloxy or butyloxy groups, are suitable too. The said compounds are new.

The new 3-hydroxy-3'-methoxybenzidine may be obtained, for example, from dianisidine by partial saponification, for instance, with sulphuric acid of moderate concentration. The tetrazotization of these compounds may be conducted in known manner, for example, in a hydrochloric acid solution.

The azo components to be united with the tetrazotized 3-hydroxy-3'-alkoxybenzidines may for instance belong to the benzene or naphthalene series, possess a heterocyclic system, or contain the carbon atom capable of coupling in an open chain. There may be, way of example, be mentioned phenols and particularly salicylic acid, resorcinol, naphthols, naphthol mono- and disulfonic acids, aminonaphthols and their sulfonic acids as well as other components normally used for the manufacture of azo dyestuffs. Furthermore, there come into consideration particularly also pyrazolones, which may be substituted in known manner for example by an aryl radical in 1-position and by a methyl or carboxyl group in 3-position. In this case also the aryl nucleus, for example the benzene nucleus, may carry substituents such as for example a sulfamide group, a nitro or amino group as well as the salicylic acid grouping. As open chain azo components there come for instance into consideration acetoacetic acid arylides.

For coupling with the tetrazotized 3-hydroxy-3'-alkoxy-benzidines 2 molecular proportions of the same or different coupling components may be used. If disazo dyestuffs are aimed at, coupling components are used which do not contain azo groups. Particularly valuable dyestuffs are in many cases obtained if, as azo components at least one pyrazolone is used, and/or such components which contain the salicylic acid grouping. Both characteristics may simultaneously be present in the same compound, such as in the case of 1-(3'-carboxy-4'-hydroxyphenyl)-3-methyl-5-pyrazolone.

In this manner a great number of very valuable disazo dyestuffs may be obtained according to the present invention. For the production of trisazo and polyazo dyestuffs use may be made with advantage of azo components which contain an amino group capable of further diazotization or a radical convertible into such an amino group. Further, one may also use such azo components which are capable of repeated coupling, or also such components which lend themselves to other connecting reactions leading to the synthesis of polyazo dyestuffs such as urea formation, reductive connection of two nitro groups, etc. As examples there are mentioned 1-(3'-aminophenyl)-3-methyl-5-pyrazolones, 2-amino-5-hydroxynaphthalene-7-sulfonic acid, resorcinol and 5:5'-dihydroxy-2:2'-dinaphthylamino-7:7'-disulfonic acid. The dyestuffs thus obtained may then be converted in known manner into trisazo or polyazo dyestuffs. Furthermore tris- and polyazo dyestuffs can be obtained by using mono- and polyazo dyestuffs capable of coupling as coupling components either on one side only or on both sides.

Since in the tetrazotized 3-hydroxy-4:4'-diaminodiphenyls whose 3'-position is occupied by a substituent free from salt forming properties the 4'-diazo group possesses a greater coupling energy than the 4-diazo group, it is well possible and in many instances preferable to unite the said tetrazo compounds successively with two different coupling components. In this case it may be of advantage to couple the said tetrazo compound first with a coupling component which is capable of forming complex metal compounds by itself, i. e. without the aid of the azo group attached to the diaminodiphenyl component. This condition is fulfilled for example with salicylic acid, or coupling components containing the salicylic acid group or an ortho-ortho'-dihydroxy azo grouping or an ortho-hydroxy-ortho-carboxy grouping, etc. As second coupling components those are preferred which allow coupling in ortho position to a hydroxyl group thus leading to an ortho-ortho'-dihydroxy grouping, with the hydroxyl group of the tetrazo component.

The dyestuffs obtained according to the present invention are suitable for dyeing and printing the most various animal and particularly cellulosic fibers such as wool, silk, leather and especially cotton, linen, rayon and staple fiber from regenerated cellulose. Amongst others very valuable red shades are also obtained.

Favorable results are obtained if agents yielding metal, particularly agents yielding copper are caused to react on the dyestuffs obtained which reaction may be performed in substance, in the dyeing bath, or on the fiber. If the dyestuff, for instance due to the presence of two or more groups lending solubility to the dyestuffs, particularly sulfonic acid groups, is constituted in such a manner that its complex metal compounds produced in substance, for instance complex copper compounds, are still soluble, the latter may be produced in known manner and used for dyeing. Dyeings of particularly good fastness to wet-treatments are obtained in many cases with such dyestuffs obtainable according to the present invention, whose complex metal compounds are sparingly soluble to insoluble. If use is made of such dyestuffs it is of advantage to work for example according to the known after-coppering process or more simply according to the dyeing process known for example from the U. S. Patent 2,148,659 (see also French Patent No. 809,893), according to which dyeing is conducted in the same bath as the after-treatment with agents yielding metal, particularly agents yielding copper. Such agents yielding copper mainly come into consideration which are stable towards alkalies, such as complex copper tartrates.

3-hydroxy-3'-methoxybenzidine used in the following examples can be produced as follows:

560 parts of sulfuric acid of 65 percent strength are heated to 135° C. and then introduced into 125 parts of dianisidine. Whilst stirring and cooling in the reflux apparatus the mixture is heated during about 36 hours to the boil (140° C.). The whole is then allowed to cool to about 20° C. whilst stirring and the precipitate obtained filtered off. The residue is suspended in 400 parts of water and mixed at 60° C. with a caustic soda solution of about 10 percent strength until a very weakly alkaline reaction occurs. A mixture of 3-hydroxy-3'-methoxybenzidine and 3:3'-dihydroxybenzidine separates. This mixture is filtered, washed with water and dried. From the dried base mixture the 3-hydroxy-3'-methoxybenzidine may be extracted with chlorobenzene at 100° C. By repeated recrystallization from benzene 3-hydroxy-3'methoxybenzidine of melting point 153–154° C. is obtained.

The following examples illustrate the invention, the parts being by weight unless otherwise stated:

*Example 1*

2.3 parts of 3-hydroxy-3'-methoxybenzidine are dissolved in 5 parts by volume of hydrochloric acid of 30 percent strength and 100 parts of water, and tetrazotized at 5 to 10° C. with 20 parts of a n-sodium nitrite solution. The tetrazo compound is added to a solution of 1.7 parts of salicylic acid and 6 parts of sodium carbonate in 50 parts of water and stirred for one hour at 5 to 10° C. The reaction mixture is then mixed with a solution of 2.55 parts of 1-(3'-sulfamidophenyl)-3-methyl-5-pyrazolone and 2 parts of sodium carbonate in 50 parts of water and the whole is stirred for 90 hours at 20 to 25° C. The dyestuff thus obtained of the probable formula

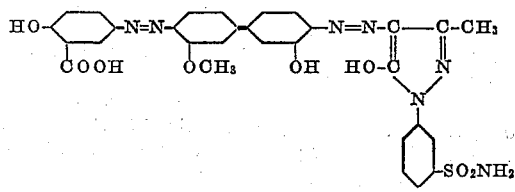

is then separated in the heat by addition of sodium chloride and filtered off. It is a dark powder, which dissolves in water and dilute alkalies to a brown-red and in concentrated sulfuric acid to a ruby-red solution. The dyestuff dyes cotton red shades which are fast to washing on being dyed and coppered according to the one bath process.

*Example 2*

2.3 parts of 3-hydroxy-3'-methoxybenzidine are dissolved in 5 parts by volume of hydrochloric acid of 30 percent strength and 100 parts of water, and tetrazotized at 5 to 10° C. with 20 parts of a N-sodium nitrite solution. The tetrazo compound is added to a solution of 5.06 parts of 1-(3'-sulfamidophenyl) - 3-methyl-5-pyrazolone and 10 parts of sodium carbonate in 100 parts of water and stirred at first for one hour at 10 to 15°, then for 90 hours at 20 to 25°. The separated dyestuff thus obtained of the probable formula

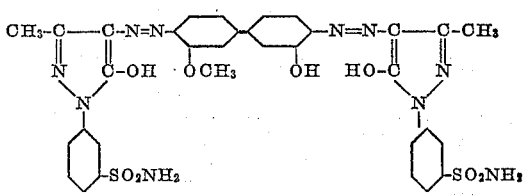

is filtered off, washed with a solution of sodium chloride of 10 percent strength, and then dried. It forms a dark powder, which dissolves in water and sodium carbonate solution to a brown-red, in dilute caustic alkalies to an orange and in concentrated sulfuric acid to a ruby-red solution. The dyestuff dyes cotton red shades which are fast to washing on being dyed and coppered according to the one bath process.

Example 3

5.75 parts of 3-hydroxy-3'-methoxy-benzidine are tetrazotized in the usual manner and in the presence of hydrochloric acid with sodium nitrite. The clear solution of the tetrazo compound is to be united at 5° C. with a solution of 3.5 parts of salicylic acid and 6 parts of sodium hydroxide in 40 parts of water and the whole mixture stirred for ½ hour at 4 to 6° C. After this time the monoazo dyestuff is formed. A solution of 5.85 parts of 1-(4'-hydroxy-3'-carboxyphenyl)-3-methyl-5-pyrazolone and 2 parts of sodium hydroxide in 50 parts of water are added to the coupling mixture. This mixture is stirred for 1 hour at 10 to 12° C. and then for 20 hours at 15 to 20°. By addition of sodium chloride the dyestuff thus obtained of the probable formula

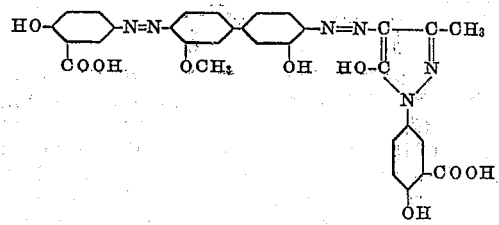

is separated. When dry it forms a green-black bronzy powder, which dissolves in water to an orange-brown, in dilute alkalies to an orange-red and in concentrated sulfuric acid to a ruby-red solution and which dyes vegetable fibers red shades which are fast to washing and light, on being dyed and coppered according to the one bath process.

Analogous dyestuffs are obtained, if the 1-(4'-hydroxy-3'-carboxyphenyl)-3-methyl-5-pyrazolone used in the above example is replaced by the equivalent quantity of 1-(3'-nitro-phenyl)-3-methyl-5-pyrazolone, 1-(4'-β-hydroxyethoxyphenyl)-3-methyl-5-pyrazolone or 3-methyl-5-pyrazolone.

Example 4

5.75 parts of 3-hydroxy-3'-methoxy-benzidine are tetrazotized with sodium nitrite in the usual manner and in the presence of hydrochloric acid. The clear solution of the tetrazo compound is united with a solution of 3.46 parts of salicylic acid and 6 parts of sodium hydroxide in 40 parts of water at 5° C. The whole is stirred for ½ to 1 hour at 4 to 6° C., a solution of 4.73 parts of 1-(3'-aminophenyl)-3-methyl-5-pyrazolone and 2 parts of sodium hydroxide in 50 parts of water is added and stirring is continued for 1 hour at 10 to 12° C. and then for 20 to 25 hours at 15 to 20° C. After the neutralization with hydrochloric acid the disazo dyestuff is filtered off and dissolved by addition of 2 parts of sodium hydroxide in 400 parts of water at 50° C. 25 parts by volume of a N-sodium nitrite solution are added to the dyestuff solution. After addition of 100 parts of ice 65 parts of 2N-hydrochloric acid are introduced. After 25 hours' stirring at 10 to 15° C. the diazotization is complete. The diazo-disazo dyestuff is separated by addition of sodium chloride and added as a moist paste to a solution of 5.85 parts of 1-(4'-hydroxy-3'-carboxyphenyl)-3-methyl-5-pyrazolone and 6 parts of sodium hydroxide in 90 parts of water. The whole is stirred for one hour at 10 to 12° C. and coupling is completed at 18 to 20° C. The trisazo dyestuff thus obtained of the formula

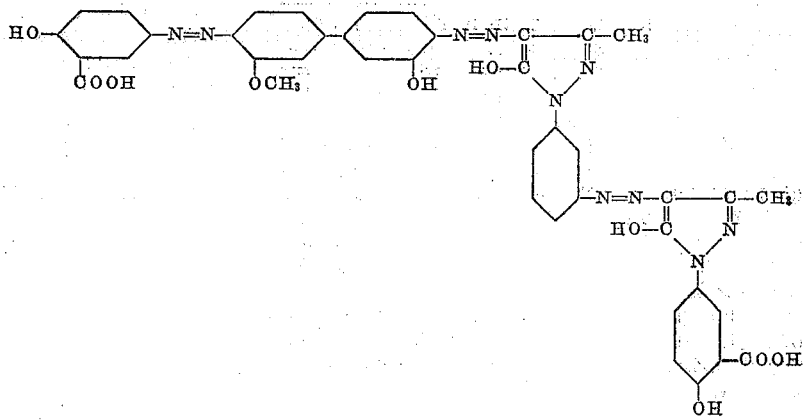

is filtered off and dried. It is a dark powder, which dissolves in water to an orange-brown, in dilute alkalies to a brown-red and in concentrated sulfuric acid to a fuchsine red solution and dyes vegetable fibers red shades which are fast to washing and to light, on being dyed and coppered according to the one bath process.

Analogous dyestuffs are obtained, if the 1-(3'-aminophenyl)-3-methyl-5-pyrazolone, used in the above example, is replaced by the equivalent quantity of 1-(4'-aminophenyl)-3-methyl-5-pyrazolone, or if the 1-(4'-hydroxy-3'-carboxyphenyl)-3-methyl-5-pyrazolone, used in the present example, is replaced by the equivalent quantity of 1-(4'-β-hydroxyethoxyphenyl)-3-methyl-5-pyrazolone, 2-amino-5-oxynaphthalene-7-sulfonic acid, 2-(4'-hydroxy-3'-carboxyphenyl)-amino-5-hydroxy-naphthalene-7-sulfonic acid or the monoazo dyestuff from diazotized 2-amino-1-phenol-4-sulfamide and resorcinol, respectively, or if the salicylic acid, used in the above example, is replaced by the equivalent quantity of ortho-cresotinic acid or meta-cresotinic acid.

Example 5

2.3 parts of 3-hydroxy-3'-methoxybenzidine are dissolved in 5 parts by volume of hydrochloric acid of 30 percent strength and 100 parts of water, and tetrazotized at 5 to 10° C. with 20 parts by volume of sodium nitrite solution. The tetrazo compound is added to a solution of 4.8 parts of 1-amino-8-naphthol-4-sulfonic acid, 6 parts of sodium chloride and 2 parts of caustic soda solution of 30 percent strength in 50 parts of water. The reaction mixture is stirred for 50 hours at 15 to 20° C. and the dyestuff separated by addition of sodium chloride. After drying it forms a dark powder, which dissolves in water and sodium carbonate solution to a pure blue, in dilute caustic alkalies to a violet blue, in dilute acetic acid to a violet and in concentrated sulfuric acid to a greenish blue solution. The dyestuff thus obtained of the probable formula

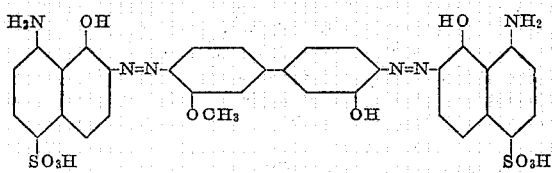

dyes cotton blue shades, which are fast to washing on being dyed and coppered according to the one bath process.

*Example 6*

4.6 parts of 3-hydroxy-3'-methoxybenzidine are tetrazotized with sodium nitrite in the usual manner and in presence of hydrochloric acid. The tetrazo solution is united with a mixture of 18.44 parts of 5.5'-dihydroxy-2.2'-dinaphthylamino-7:7'-disulfonic acid and 20 parts of calcined hydroxide in 50 parts of water at 5° C. The whole is stirred for one hour at 5 to 8° C. for 16 hours at 18 to 20° and the coupling is completed at 25 to 30° C. After addition of 30 parts of sodium carbonate and 400 parts of water the coupling mixture is heated for some time to 50° C. The whole is filtered off from the precipitated calcium carbonate and the dyestuff is isolated by addition of sodium chloride and hydrochloric acid. When dry it forms a dark green-bronzy powder of the probable formula

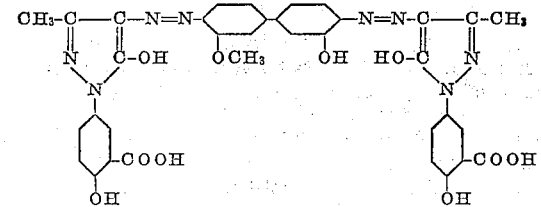

which dissolves in water and dilute alkalies to a cornflower blue and in concentrated sulfuric acid to a greenish blue solution and dyes vegetable fibers blue shades which are fast to washing on being after-treated with copper compounds.

*Example 7*

5.75 parts of 3-hydroxy-3'-methoxybenzidine are tetrazotized with sodium nitrite in the usual manner and in presence of hydrochloric acid. The clear solution of the tetrazo compound is united with a solution of 11.7 parts of 1-(4'-hydroxy-3'-carboxyphenyl)-3-methyl-5-pyrazolone and 8 parts of sodium hydroxide in 100 parts of water at 5° C. The whole is stirred for 1 hour at 5 to 8° C. for a further hour at 10 to 15° C. and the coupling is completed at 20–25° C. The disazo dyestuff is filtered off and dried. It is a dark green-bronzy powder of the probable formula

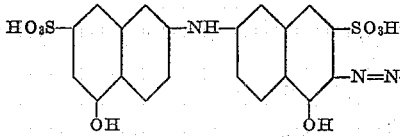

which dissolves in water to a brown-red, in dilute soda solution to an orange-brown, in dilute caustic alkalies to an orange and in concentrated sulfuric acid to a fuchsine-red solution and dyes vegetable fibers bordeaux-red shades which are very fast to washing and light on being dyed and coppered according to the one bath process.

*Example 8*

5.75 parts of 3-hydroxy-3'-methoxybenzidine are tetrazotized with sodium nitrite in the usual manner and in presence of hydrochloric acid. The clear solution of the tetrazo compound is added at 10–15° C. to a solution alkaline with sodium carbonate of 7.73 parts of the dyestuff prepared by coupling 1 molecular proportion of diazotized 2-amino-1-phenol-4-sulfamide with 1 molecular proportion of resorcinol in a medium alkaline with sodium carbonate. The whole is stirred for 1 hour at 10 to 12° C. and a caustic-alkaline solution of 5.85 parts of 1-(4'-hydroxy-3'-carboxyphenyl)3-methyl-5-pyrazolone is then added to the coupling mixture. The whole is again stirred for 1 hour at 15 to 18° and the coupling is completed by heating to 35 to 40° for 20 to 30 hours. The trisazo dyestuff is separated by addition of sodium chloride and hydrochloric acid. When dry it is a green powder of bronze lustre of the probable formula

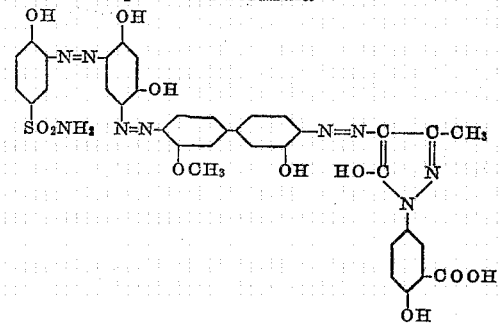

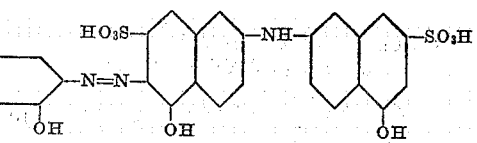

which dissolves in water and dilute sodium carbonate solution to a bordeaux-red, in dilute caustic alkalies to a brown-red, and in concentrated sulfuric acid to a dichroic red-blue solution and dyes vegetable fibers violet brown shades which are fast to washing on being dyed and coppered according to the one bath process.

Analogous dyestuffs with equal fastness properties are obtained, when replacing 2-amino-1-phenol-4-sulfamide by other ortho-aminophenols, for example, by the equivalent quantity of 4-nitro-2-amino-1-phenol.

*Example 9*

100 parts of cotton are introduced at 50° C. into a dye-bath containing in 2500 parts of water 2 parts of sodium carbonate and 1.5 parts of the dyestuff prepared according to Example 3, first paragraph, and the temperature is slowly raised to 90–95° C. 30 parts of Glauber's salt are added after ¼ hour and dyeing is continued at this temperature for a further ¾ hour. The bath is then cooled to about 70° C., the necessary quantity of a solution of complex copper tartrate made feebly alkaline with sodium carbonate is added and the material is coppered at 80–90° C. for ½ hour. It is thoroughly rinsed and soaped for a short time, if necessary. The cotton is dyed fast red tints.

What we claim is:
1. A dyestuff of the formula

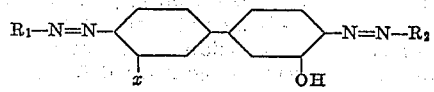

wherein $R_1$ and $R_2$ stand for radicals of coupling components selected from the class consisting of coupling components of the benzene, naphthalene and pyrazolone series, $x$ stands for an alkoxy group, and $R_2$ contains a hydroxyl group in a position vicinal to the azo group.

2. A dyestuff of the formula

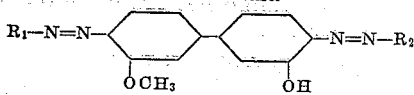

wherein $R_1$ and $R_2$ stand for radicals of coupling components selected from the class consisting of coupling components of the benzene, naphthalene and pyrazolone series, and $R_2$ contains a hydroxyl group in a position vicinal to the azo group.

3. A dyestuff of the formula

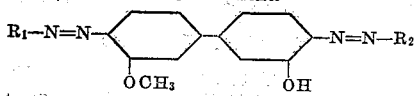

wherein $R_1$ and $R_2$ stand for different radicals of coupling components selected from the class consisting of coupling components of the benzene, naphthalene and pyrazolone series, and $R_2$ contains a hydroxyl group in a position vicinal to the azo group.

4. A dyestuff of the formula

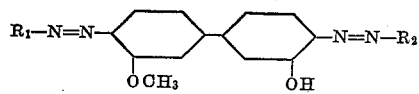

wherein $R_1$ stands for a radical of a hydroxyl-containing coupling component selected from the class consisting of coupling components of the benzene, naphthalene and pyrazolone series which is capable of forming complex metal compounds by itself and $R_2$ stands for a radical of a hydroxyl-containing coupling component selected from the class consisting of coupling components of the benzene, naphthalene and pyrazolone series which is bound to the azo group in a position vicinal to a hydroxyl group.

5. A dyestuff of the formula

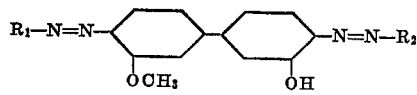

wherein $R_1$ stands for a radical of a coupling component selected from the class consisting of coupling components of the benzene, naphthalene and pyrazolone series and capable of forming complex metal compounds by itself and $R_2$ stands for a pyrazolone coupling component.

6. A dyestuff of the formula

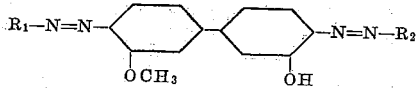

wherein $R_1$ stands for a radical of a salicylic acid and $R_2$ stands for a pyrazolone coupling component.

7. A dyestuff of the formula

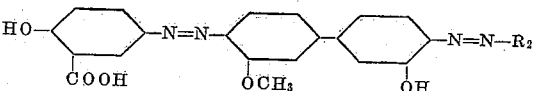

wherein $R_2$ stands for a pyrazolone coupling component.

8. A dyestuff of the formula

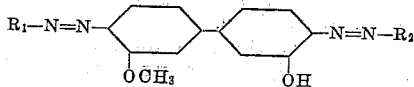

wherein $R_1$ stands for the radical of a monoazo dyestuff capable of coupling and capable of forming complex metal compounds, said monoazo dyestuff being built up from components selected from the benzene, naphthalene and pyrazolone series, and $R_2$ stands for a pyrazolone coupling component.

9. A dyestuff of the formula

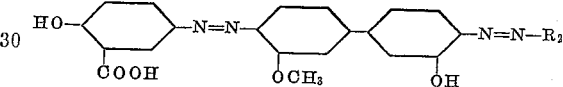

wherein $R_2$ stands for a pyrazolone coupling component containing at least one azo group.

10. The dyestuff of the formula

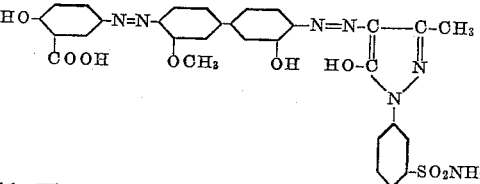

11. The dyestuff of the formula

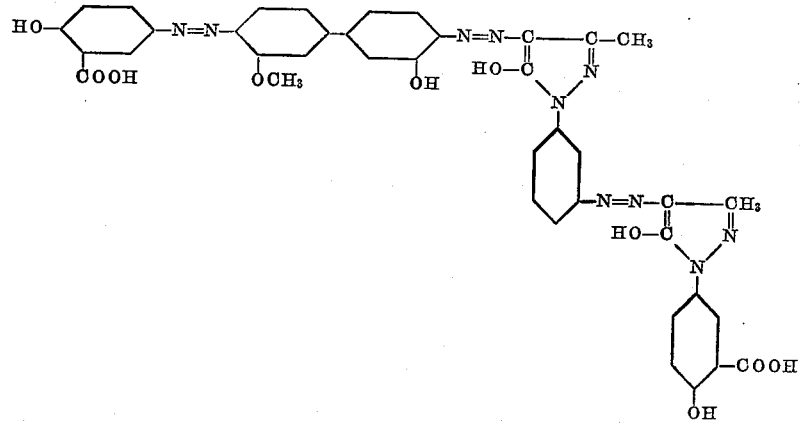

12. The dyestuff of the formula

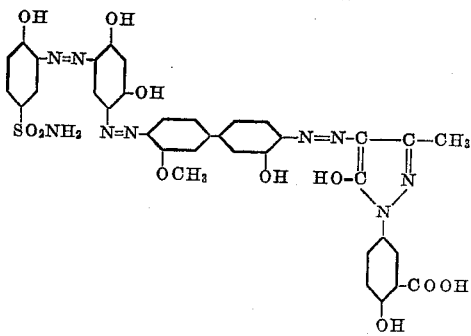

13. Process for the manufacture of a dyestuff containing at least two azo groups, comprising coupling a tetrazotized 3-hydroxy-3'-methoxy-4:4'-diaminodiphenyl first with one molecular proportion of salicylic acid and afterwards with one molecular proportion of 1-(3'-sulfamidophenyl)-3-methyl-5-pyrazolone.

14. Process for the manufacture of a trisazo dyestuff, comprising coupling tetrazotized 3-hydroxy-3'-methoxy-4:4'-diaminodiphenyl first with one molecular proportion of salicylic acid, then with one molecular proportion of 1-(3'-aminophenyl)-3-methyl-5-pyrazolone, diazotizing the amino-disazo dyestuff thus obtained and coupling the diazo compound with one molecular proportion of 1-(4'-hydroxy-3'-carboxyphenyl)-3-methyl-5-pyrazolone.

15. Process for the manufacture of a trisazo dyestuff, comprising coupling tetrazotized 3-hydroxy-3'-methoxy-4:4'-diaminodiphenyl first with one molecular proportion of the monoazo dyestuff from diazotized 2-amino-1-hydroxy-benzene-4-sulfamide and resorcinol and afterwards with one molecular proportion of 1-(4'-hydroxy-3'-carboxyphenyl)-3-methyl-5-pyrazolone.

FRITZ STRAUB.
JAKOB BRASSEL.

REFERENCES CITED

The following references are of record in the file of this patent:

UNITED STATES PATENTS

| Number | Name | Date |
|---|---|---|
| 412,148 | Williams | Oct. 1, 1889 |
| 1,210,751 | Anderwert et al. | Jan. 2, 1917 |
| 1,792,355 | Boeniger | Feb. 10, 1931 |
| 1,889,732 | Stusser et al. | Nov. 29, 1932 |
| 1,995,902 | Scheurer et al. | Mar. 26, 1935 |
| 2,193,438 | Taube et al. | Mar. 12, 1940 |
| 2,241,796 | Taube et al. | May 13, 1941 |

FOREIGN PATENTS

| Number | Country | Date |
|---|---|---|
| 13,235 | Great Britain | June 27, 1891 |
| 18,020 | Breat Britain | June 26, 1896 |
| 102,881 | Great Britain | Jan. 4, 1917 |

Certificate of Correction

Patent No. 2,459,467.  January 18, 1949

FRITZ STRAUB ET AL.

It is hereby certified that error appears in the printed specification of the above numbered patent requiring correction as follows:

Columns 9 and 10, claim 11, in the formula, right-hand portion thereof, for 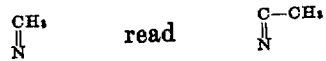

and that the said Letters Patent should be read with this correction therein that the same may conform to the record of the case in the Patent Office.

Signed and sealed this 7th day of June, A. D. 1949.

[SEAL]

THOMAS F. MURPHY,
*Assistant Commissioner of Patents.*